United States Patent [19]

Zambrano

[11] 4,236,733
[45] Dec. 2, 1980

[54] FIRE HOSE COUPLING DEVICE

[76] Inventor: Thomas P. Zambrano, 892 Palerno Rd., St. Augustine, Fla. 32084

[21] Appl. No.: 74,310

[22] Filed: Sep. 11, 1979

[51] Int. Cl.³ .............................................. F16L 55/00
[52] U.S. Cl. ......................................... 285/23; 285/24; 285/39; 285/62; 285/177; 248/49; 248/75; 248/544; 81/90 B
[58] Field of Search ........................... 248/75, 487, 49; 81/90 R, 90 B, 90 C; 403/12; 285/61, 62, 63, 64, 39, 23, 24, 177

[56] References Cited

U.S. PATENT DOCUMENTS

| | | | |
|---|---|---|---|
| 1,897,248 | 2/1933 | Ferguson | 248/75 |
| 1,994,226 | 3/1935 | Martocello | 285/61 X |
| 2,798,393 | 7/1957 | Currin | 248/49 X |
| 2,846,168 | 8/1958 | Schroeter | 285/49 |
| 4,002,357 | 7/1977 | Bennett | 248/75 |

*Primary Examiner*—Dave W. Arola

[57] ABSTRACT

A firehose coupling device is provided for fixedly positioning and holding in place a set of opposed lugs on one coupling member of a firehose connection to permit quick and if desired one man coupling or uncoupling of the connection. The device includes a channel member, preferably with diverging leg portions, each leg having at least one cut out portion along the corresponding side edges of each leg so that the opposed lugs on one member are fixedly held in position and the other member may be rotated with respect to the first member.

6 Claims, 2 Drawing Figures

FIRE HOSE COUPLING DEVICE

This invention relates to a device for connecting firehose couplings and more particularly to a device which fixedly holds one member of a firehose connection in place and permits the other member to be rotated to complete or undo the connection.

BACKGROUND OF THE INVENTION

There has been a national movement to reduce the expenditures of governments at all levels. In the case of fire departments this has meant a reduction in the number of men assigned to fight fires. Manpower at actual fires must be sufficient to not only enter burning structures, but also to prepare the fire fighting equipment such as connecting hoses to a source of water and to a pumper truck. By a pumper truck is meant one which usually carries a high pressure pumping system and a load of hose.

When a pumper truck arrives at a fire scene some firemen must run out a length of hose and connect it to a source of water such as a fire hydrant connected to a water main. The hose from the pumper which is used to put water on the fire must also be hooked up to the pumper. Heretofore, two men have usually been required to make the hose connection. One holds one coupling member rigidly and the other rotates the other coupling of the connection into a tight fitting relationship with the held member. The held member will usually be a male fitting and the rotatable or free turning member will be a female fitting. By the present invention the man, who is needed to hold one member rigidly, may be eliminated.

Accordingly, it is an object of the present invention to provide a firehose coupling device which is simple, efficient and provides for a fixed positioning and holding of one coupling member of a firehose connection.

SUMMARY OF THE INVENTION

The firehose coupling device of the present invention provides a channel member having cutouts on corresponding side edges of its legs to permit fixed holding and positioning of the lugs of a firehose coupling for rapid and one man connection and uncoupling. Preferably, the channel is constructed with outwardly diverging legs so that a series of cutouts may be provided for hose couplings of various diameters.

Heretofore, a hose coupling breaker wrench has been proposed in U.S. Pat. No. 2,798,393 to Currin. In that device the lug retaining device included a series of crossbars which formed a series of spaces. However, the lugs were not fixedly held in place and were free to be moved within the form spaces. In the present invention the end cutout portion fixedly hold and position the lugs.

IN THE DRAWINGS

FIG. 1 is a side view of an illustrated embodiment of a firehose coupling device in accordance with the present invention; and FIG. 2 is a plan view of the device of FIG. 1 taken along lines 2—2 of FIG. 1.

While only one illustrated embodiment is shown others will be apparent to those skilled in the art and such other embodiments will come within the scope of the appended claims.

DESCRIPTION OF THE ILLUSTRATED EMBODIMENT

Figure 1:
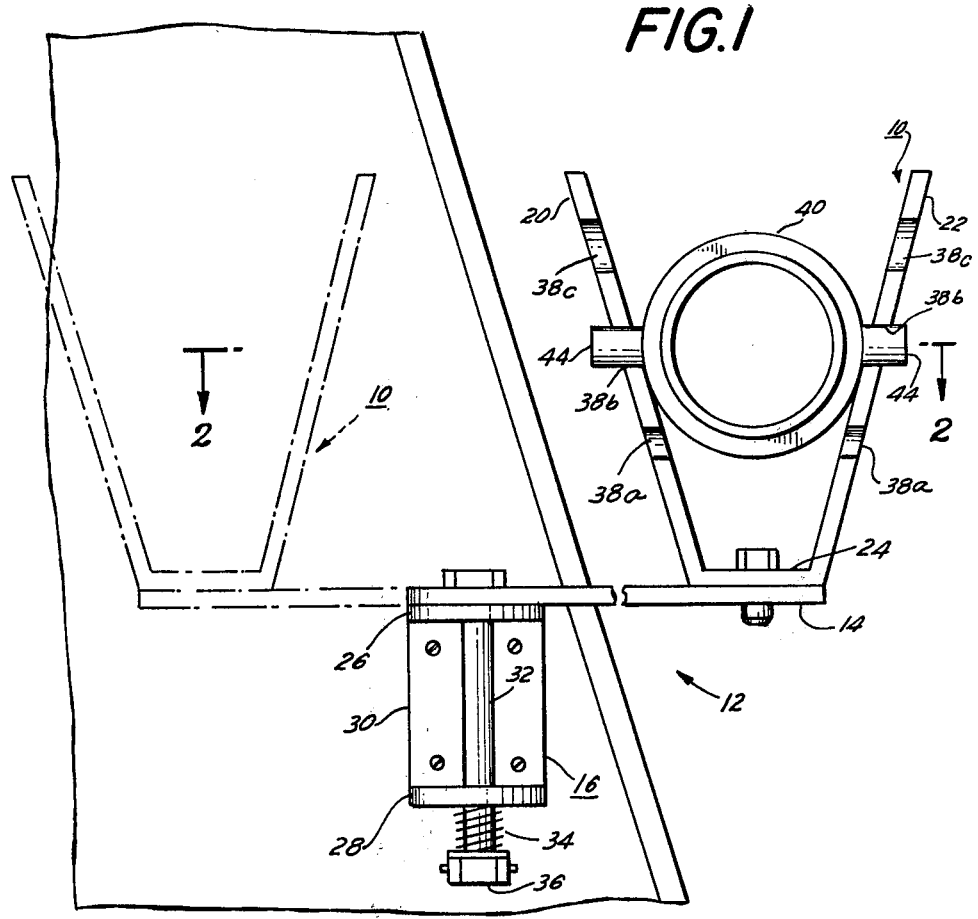

Referring to the drawings and to FIG. 1 in particular, a device 10 in accordance with the present invention is shown. The device is attached to a support 12 which includes an arm 14 and a mounting bracker 16, the bracket being formed from a channel member. The bracket is preferably mounted on a solid surface such as the vertical panel 18 at the rear of a fire truck pumper.

The device 10 is preferably shaped as a channel having a pair of legs 20 and 22 which advantageousely extend in a diverging relationship from a base 24. The base 24 is fixed to the arm 14 by any suitable means such as the illustrated nut and bolt. The mounting bracket 16 has flanges 26 and 28 and a base 30. A bolt 32 is passed through openings in the arm 14 and the flanges 26 and 28. A spring is positioned against the flange 28 and a nut 36 threaded onto the bolt so that the spring is compressed. This construction permits the arm 14 to be rotated about the bolt 32 yet not in a loose or uncontrollable manner because the spring 34 in cooperation with the bolt and nut biased the arm 14 against the flange 26.

Figure 2:
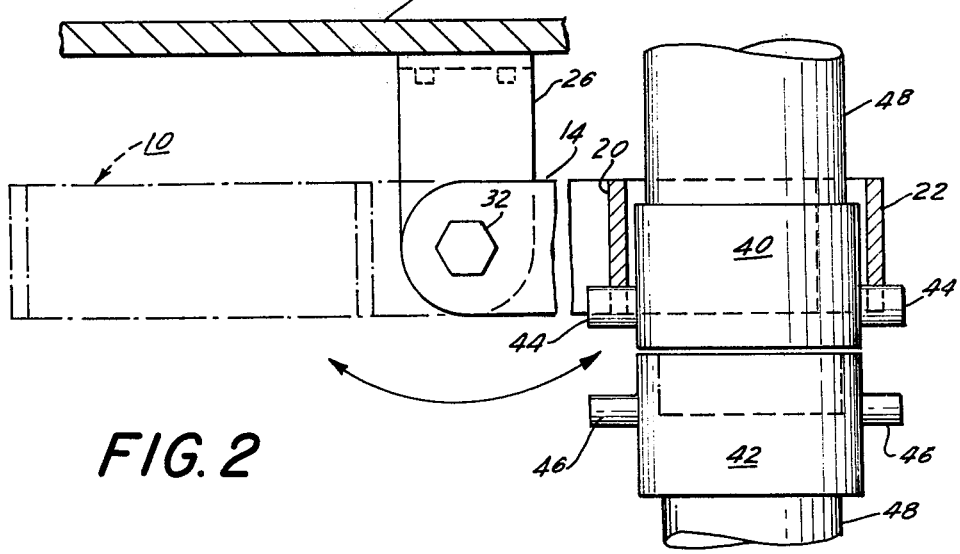

In FIGS. 1 and 2, the device 10 is shown in an operating position. When not in use it may be swung to the position indicated by the phantom lines.

As shown in FIG. 1, the legs 20 and 22 have a series of end cutouts 38a, b and c. In use one coupling member of a fire hose connection is fitted into the device 10. The usual fire hose connection consists of a male coupling 40 and a female coupling 42. Lugs 44 are provided on coupling 40 and lugs 46 on coupling 42. While the term "lugs" is used herein the term "butts" is also used by those in the art.

To connect the couplings 40 and 42 one person may do so by employing the device 10. Because the legs 20 and 22 diverge in a semi "V" configuration, the device can accomodate couplings of various diameters. In the drawings a coupling of intermediate size is illustrated. The user places the male coupling in between the legs and pulls the coupling 40 through them so that the lugs 44 become fixed and held against rotation in the slots 38b. With the coupling 40 set the connection can be completed by fitting the female coupling 42 to coupling 40 and rotating it. Lugs 46 are usable to tighten the connection by means of a lug wrench or a similar device.

The simplicity of the device makes it easy to use and yet it holds the lugs in place so that one man can quickly connect coupling together. The present invention not only saves man power, but it also save time in making the connection which may be even more important at a fire scene.

What is claimed is:

1. A fire hose coupling device for fixedly positioning and holding in place a set of opposed lugs on one coupling member of a firehose connection to permit a quick coupling or uncoupling of the firehose connection, the device comprising:
    a channel member mounted on a fixed support;
    said member having a pair of legs connected to a base portion;
    each of said legs having along at least corresponding side edges at least one cut out portion whereby the opposed lugs of one member are fixedly held in position permitting the other member of the connection to be rotated with respect to the first member.

2. A firehose coupling device as defined in claim 1, wherein the legs of the channel member diverge outwardly as they extend away from the base.

3. A firehose coupling device as defined in claim 2, wherein each of the legs have along at least one side edge portion two or more cutout portions in opposed relationship to permit coupling members of different cross sectional extents to be accomodated in the channel member.

4. A firehose coupling device as defined in claim 1 wherein the support member includes an arm connected to the channel member and extending from a fixed mounting support.

5. A firehose coupling device as defined in claim 4 wherein the arm is rotatable about the mounting support to permit the channel to be variably positioned with respect to the mounting support.

6. A firehose coupling device as defined in claim 5 wherein the mounting support is adapted to be mounted on a fire truck pumper unit.

* * * * *